2,965,539

STABILIZATION OF PENTACHLOROPHENOL SOLUTIONS

Harry W. Loper, Bay City, and Richard D. Samson, Midland, Mich., assignors to The Dow Chemical Company, Midland, Mich., a corporation of Delaware No Drawing. Filed Jan. 15, 1957, Ser. No. 634,160

9 Claims. (Cl. 167—31)

This invention relates to a composition of matter comprising essentially a solution of pentachlorphenol in mineral spirits containing an inhibitor and to a method of preventing the decomposition of pentachlorophenol when dissolved in mineral spirits.

Pentachlorophenol is widely used as a wood preservative and it is usually marketed as a product containing from 3 to 15 weight percent of pentachlorophenol dissolved in mineral spirits. In treating the food with pentachlorophenol, the wood is either dipped, sprayed, or painted with the solution and the pentachlorophenol remains after the evaporation of the solvent. In this application the pentachlorophenol is dissolved in mineral spirits or other volatile solvents in order to effectively impregnate the wood and to aid in its application. In marketing these solutions as compositions which are satisfactory for direct application, the pentachlorophenol will decompose upon standing and the solution will develop a reddish to a dark purple color which adversely affects its salability. This decomposition is encountered to a limited extent even when the solution is stored in glass, but it is greatly increased when the solution comes in contact with ferrous metals in the presence of moisture.

It is, therefore, a principal object of this invention to provide a stabilized composition of matter comprising essentially solutions of pentachlorophenol in mineral spirits containing an inhibitor and to provide a method for stablizing mineral spirit solutions of pentachlorophenol.

The above and other objects may be accomplished by adding to a mineral spirit solution of pentachlorophenol in small proportion sufficient to inhibit the decomposition of the pentachlorophenol an organic ester having a general formula:

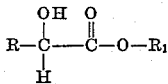

where R represents hydrogen or alkyl groups having from 1 to 4 carbon atoms and $R_1$ represents alkyl groups having from 1 to 6 carbon atoms. The pentachlorophenol solution stabilized according to the invention may be stored in metal containers and will not decompose or develop the objectionable color even in the presence of moisture.

The organic esters which are effective in inhibiting the decomposition are those having the general formula given above. Ethyl, propyl, and n-butyl lactates are preferred due to their effectiveness and availability. Small proportions of the inhibitor are sufficient to stabilize the pentachlorophenol solutions. In general the amount of the ester used is equal to from 1 to 10 weight percent of the pentachlorophenol in the solution. Thus the more concentrated solutions of pentachlorophenol will require more inhibitor.

The following example illustrates the invention but is not to be construed as limiting.

Example

A solution of 5 weight percent of pentachlorophenol in mineral spirits was placed in three iron drums. In the first drum no inhibitor was added. In the second drum ethyl lactate in an amount equal to about 10 weight percent of the pentachlorophenol was added and in the third the same amount of normal butyl lactate. These drums were stored for 6 months. The solution in the first drum which had no inhibitor developed a dark purple color. The solution in the other two drums remained clear.

In a manner similar to that of the foregoing, methyl, propyl, isopropyl, and isobutyl lactates, glycollates, alpha-hydroxybutyrates, alpha-hydroxypentanoates, and alpha-hydroxyhexoates may be substituted for the ethyl and butyl lactates specifically shown, to achieve an inhibiting effect of pentachlorophenol.

What is claimed is:

1. A composition of matter comprising essentially a mineral spirit solution of pentachlorophenol and an organic ester having the formula:

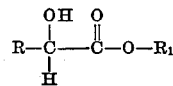

where R is selected from the group consisting of hydrogen and alkyl groups having from 1 to 4 carbon atoms and $R_1$ represents an alkyl group having from 1 to 6 carbon atoms added thereto in a small proportion sufficient to inhibit the decomposition of the pentachlorophenol.

2. A composition of matter according to claim 1 wherein the organic ester is ethyl lactate.

3. A composition of matter according to claim 1 wherein the organic ester is n-butyl lactate.

4. A composition of matter comprising from 3 to 15 weight percent of pentachlorophenol dissolved in mineral spirits and from 1 to 10 weight percent, based upon the pentachlorophenol, of an organic ester having the general formula:

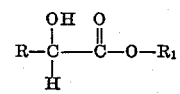

where R is selected from the group consisting of hydrogen and alkyl groups having from 1 to 4 carbon atoms and $R_1$ represents an alkyl group having from 1 to 6 carbon atoms.

5. A composition of matter according to claim 4 wherein the organic ester is ethyl lactate.

6. A composition of matter according to claim 4 wherein the organic ester is n-butyl lactate.

7. A composition of matter comprising a 5 weight percent solution of pentachlorophenol in mineral spirits and 10 weight percent, based upon the pentachlorophenol, of ethyl lactate.

8. A composition of matter which comprises a 5 weight percent solution of pentachlorophenol in mineral spirits and 10 weight percent, based upon the pentachlorophenol, of n-butyl lactate.

9. In a procedure in which a mineral spirits solution of pentachlorophenol is stored in contact with ferrous metal, the method of preventing the discoloration of the pentachlorophenol solution, which comprises maintaining dissolved in the pentachlorophenol solution a small effective proportion of an organic ester having the formula:

where R is selected from the group consisting of hydrogen and alkyl groups having from 1 to 4 carbon atoms and $R_1$ represents an alkyl group having from 1 to 6 carbon atoms.

References Cited in the file of this patent

UNITED STATES PATENTS

| | | |
|---|---|---|
| 2,072,923 | Crocker et al. | Mar. 16, 1937 |
| 2,236,970 | Goldfarb | Apr. 1, 1941 |
| 2,344,988 | Kavanagh et al. | Mar. 28, 1944 |
| 2,662,026 | Danitoff | Dec. 8, 1953 |
| 2,752,398 | Riley | June 26, 1956 |
| 2,789,936 | Davies | Apr. 23, 1957 |
| 2,829,176 | Claugh | Apr. 1, 1958 |